United States Patent [19]
Lim et al.

[11] Patent Number: 5,633,499
[45] Date of Patent: May 27, 1997

[54] SCATTER ELIMINATION TECHNIQUE AND APPARATUS IN RADIONUCLIDE EMISSION AND TRANSMISSION IMAGING IN A NUCLEAR CAMERA

[75] Inventors: Chun B. Lim, Moreland Hills; Barry D. Kline, Cleveland Heights; Vitaliy Rappoport, Solon, all of Ohio

[73] Assignee: Trionix Research Laboratory, Inc., Twinsburg, Ohio

[21] Appl. No.: 561,273

[22] Filed: Nov. 21, 1995

[51] Int. Cl.$^6$ .................................................. G01T 1/17
[52] U.S. Cl. ........................................ 250/363.07; 378/87
[58] Field of Search .......................... 250/363.07; 378/87

[56] References Cited

U.S. PATENT DOCUMENTS

| | | |
|---|---|---|
| 4,839,808 | 6/1989 | Koral et al. |
| 5,081,581 | 1/1992 | Koral et al. |
| 5,227,968 | 7/1993 | Ichihara ............................... 364/413.24 |
| 5,293,195 | 3/1994 | Berlad et al. |
| 5,315,506 | 5/1994 | Wang et al. |
| 5,371,672 | 12/1994 | Motomura et al. |
| 5,431,161 | 7/1995 | Ryals et al. |
| 5,434,414 | 7/1995 | Berlad et al. |
| 5,438,202 | 8/1995 | Matanzon et al. |

OTHER PUBLICATIONS

Irène Buvat, et al., "Comparative Assessment of Nine Scatter Correction Methods Based on Spectral Analysis Using Monte Carlo Simulations"; *The Journal of Nuclear Medicine;* vol. 36—No. 8, Aug. 1995, pp. 1476–1488.

M.S. Rosenthal, et al., "Quantitative SPECT Imaging", *The Journal of Nuclear Medicine;* vol. 36—No. 8, Aug. 1995, pp. 1489–1513.

*Primary Examiner*—Constantine Hannaher
*Attorney, Agent, or Firm*—Pearne, Gordon, McCoy & Granger LLP

[57] ABSTRACT

Scatter errors are eliminated from a gamma camera image on a spatially dependent basis. A global scatter curve is obtained and normalized for each local area. Based on this local scatter curve and the local spectrum, a local correction factor is obtained. The correction factors are then used to remove scatter errors from the image. The method provides spatially-dependent correction based on measured scatter. It does not require the camera's zero-scatter response to be known and it does not require the fitting of spectra either by a polynomial or by a theoretical scatter function. It allows for rapid determination of scatter correction factors for each pixel in an image. It produces excellent results for both transmission and emission images.

26 Claims, 5 Drawing Sheets

SCATTER ELIMINATION TECHNIQUE AND APPARATUS IN RADIONUCLIDE EMISSION AND TRANSMISSION IMAGING IN A NUCLEAR CAMERA

BACKGROUND OF THE INVENTION

The present invention relates to the elimination of scattered photons from transmission and emission images and, in particular, to the elimination of such photons as a function of pixel location.

The problem of Compton scattering is well-known in gamma cameras. This scattering results in photons appearing to have originated at incorrect locations. Some of these photons can be ignored on the basis of their significantly reduced energy, but others have energy levels comparable to the unscattered photons.

In the typical 50 to 500 keV operating region of gamma cameras, small scattering angles are much more probable than large angles. Therefore, scattered photons still have a high probability of passing through a collimator. The finite energy resolution of gamma cameras (8 to 10 percent) prevents discrimination of the slight energy shift caused by scattering. Because of varying angle, scattered photons detected in the camera point in the "wrong" direction and decrease image quality. Because of the detection of photons emitted not only from the region of interest inside the patient body but also photons scattered from other regions, scattered photons make accurate quantitative analysis impossible.

Traditional SPECT cameras are increasingly being employed for transmission scanning operations in conjunction with the standard emission study. A transmission scan uses an external radioactive source to quantify distribution of tissue densities. The information is used to correct for the nonuniform attenuation during emission study.

The photons of the transmission source are subject to the same Compton scattering process that occurs with emission photons. No current transmission scanning approach uses scatter elimination techniques to remove Compton-scattered events form the transmission images. The quantitative accuracy of the attenuation maps derived from these studies is therefore undefined.

Scatter elimination improves the resolution of an image, increases the contrast between "hot" (or radioactive high uptake) areas and "cold" ones in an emission study, allows measurement of attenuation coefficients for "narrow beam" geometry for a transmission study, and makes accurate quantitative analysis possible for both types of studies.

Because of the nature of emitted photons and the method of their detection, the energy of photons can be measured only with limited accuracy. Instead of a single spectral line in the energy domain, one has to deal with a photon spectrum or energy distribution (the number of events within a certain energy ranges). The spectrum is characterized by its shape and a few parameters, such as, the energy corresponding to a centroid of a spectrum, and spectrum full width at half of maximum (FWHM). It is a well known fact that the spectrum of "direct" unscattered photons is characterized by a Gaussian distribution.

It is important to keep in mind the Compton scattering is object dependent, because it depends on the distribution of the radioisotope inside the patient's body. Also, it is a three-dimensional phenomenon, since photons are emitted isotropically within the subject. In addition, it is not space uniform: it varies across the camera surface. This non-uniformity in the number of scattered photons detected by the camera results from its dependence on the subject, that is, the materials through which the photon should pass before detection by a camera. Therefore, the scatter content of an emission image will vary from patient to patient, from view to view at various angles around the same patient, and from area to area within the same view.

Various spatially independent methods have been proposed for reducing the scatter error, but these methods suffer greatly from the fact that the scatter error is typically very spatially dependent. The scatter error will spatially vary from patient to patient, from view to view at various angles around the same patient, and from area to area in the same view.

Various spatially dependent methods have also been proposed. These include dividing the photopeak region into two subwindows where the ratio of counts (or subwindow sizes adjusted to equal counts) is assumed to be a measure of scatter content. A fraction of events is removed from the lower subwindow on a pixel by pixel basis. This ignores the fact that many scattered photons will have been collected in the upper subwindow.

U.S. Pat. No. 5,371,672 estimates the number of scattered photons detected in each pixel from the number of events acquired within two narrow windows located on each side of the photopeak window. The contribution of the scattered events in the photopeak window is estimated as a trapezoidal area calculated to fit the counts in the narrow subwindows. The very small subwindows result in very noisy counting statistics and unreliable results on a pixel by pixel basis. In addition the assumed trapezoidal shape of the scatter function is not quantitatively accurate.

U.S. Pat. Nos. 4,839,808 and 5,081,581, incorporated herein by reference, require knowledge of a scatter-free spectrum and assumes the scatter spectrum can be represented by a third-order polynomial. For each pixel, the local spectrum is modelled as the sum of a polynomial approximating the scatter spectrum and a scatter-free spectrum multiplied by a constant. Each measured spectrum is fitted to this model to obtain polynomial coefficients and the constant. In practice, this method requires fine spectrum resolution and is very unstable, especially for pixels with low counts. The procedure for fitting spectra with two different functions assumes knowledge of these functions, for example, the order of the scatter spectrum polynomial. The method also requires knowledge of the camera's response with respect to photon energy.

U.S. Pat. No. 5,315,506 adds an energy regularization term which allows the use of separate parameters for each energy channel within the fitting window. In this method higher order polynomials can be used or non-polynomial functions. This method also suffers from requiring knowledge of the scatter-free response of the camera and is even more computationally demanding.

U.S. Pat. No. 5,293,195 also uses a spectrum fitting approach. For the scatter function, a calculation of the probability of how many scatter interactions a photon has undergone based on the Nishina-Klein equations is performed. Besides the requirement of knowing the scatter-free response of the camera, this method requires knowledge of the relevant physical model for the scattering spectra. Lack of this knowledge results in substantial inaccuracy.

The weakness of all of these methods are exacerbated in the case of combination transmission and emission imaging. This type of imaging is finding increased use in a quest to provide corrections for image inaccuracies caused by variations in the subject's composition and geometry. The traversing of the entire subject by transmission photons greatly increases the opportunity for scatter.

SUMMARY OF THE INVENTION

The method for eliminating scattered photons from transmission or emission images includes collecting a planar photon image formed by collecting a count of detected photons in a large matrix of pixels, each pixel including position coordinates and an energy spectrum for photons collected at the position coordinates. The image is divided into a plurality of local areas, each local area including at least one pixel. A local energy centroid is calculated for each local area and a total energy centroid for the image is calculated.

The spectra of local areas having respective energy centroids less than a known threshold percentage of the total energy centroid are used to estimate a local scatter correction factor for each local area that are applied to the image.

DESCRIPTION OF THE PREFERRED EMBODIMENT

Figure 1:
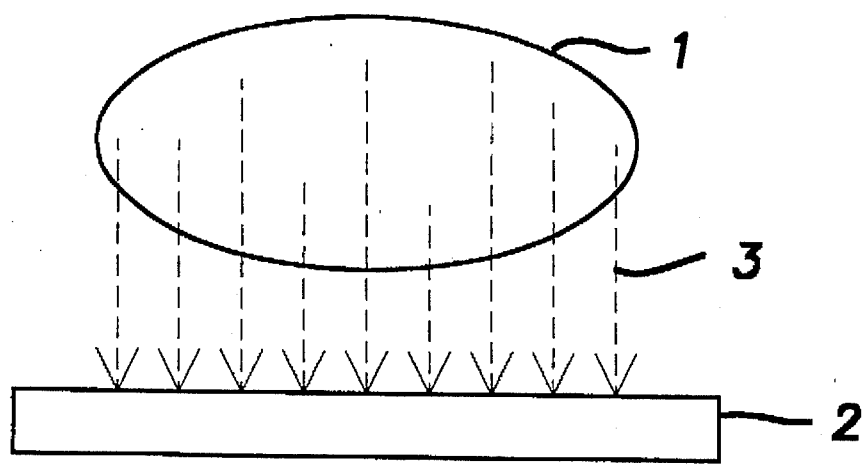
FIG. 1 is a schematic diagram of a nuclear camera for producing emission images.

Referring to FIG. 1, a simple nuclear camera or gamma camera for producing emission images consists of a planar image detector 2. A subject 3 contains a radioisotope the emits photons 3 that are detected by the detector 2 to form an image of the activity within the subject 2.

Figure 2:
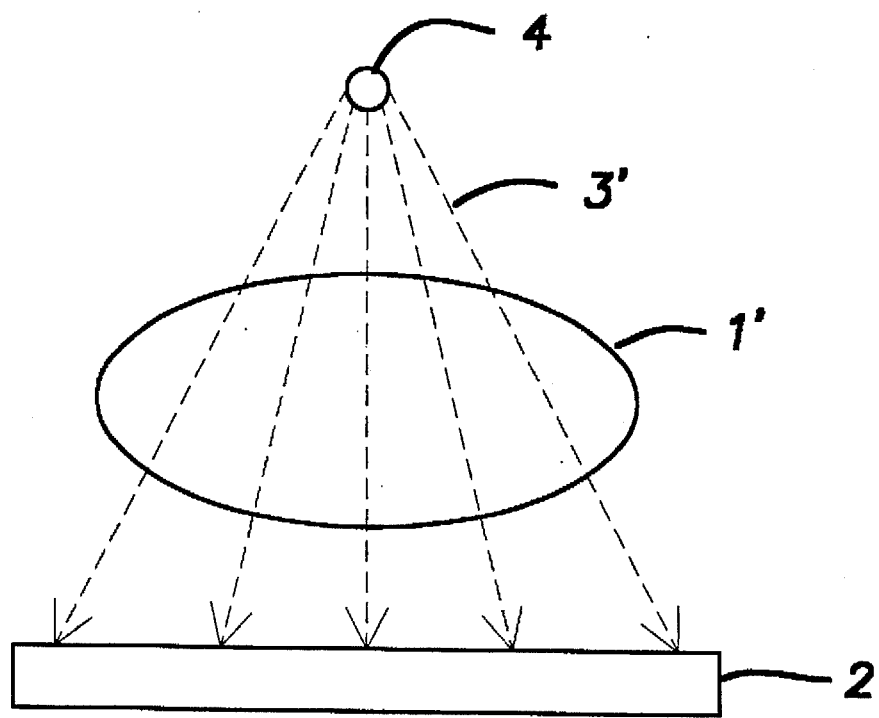
FIG. 2 is a schematic diagram of a nuclear camera for producing transmission images.

Referring to FIG. 2, a simple nuclear camera for producing transmission images consists of a planar image detector 2 and a photon source 4 (a radioisotope). Photons 3' travel through the subject 1' to the detector 2. An image of the subject 1' is formed at the detector 2 from the attenuation and other effects upon the transmission through the subject 1' of photons from the source 4.

These cameras can be combined by adding the source 4 to the camera of FIG. 1. This allows transmission studies to be performed to measure such parameters as attenuation by the subject. These parameters can then be used to improve the quality of emission studies.

Figure 3:
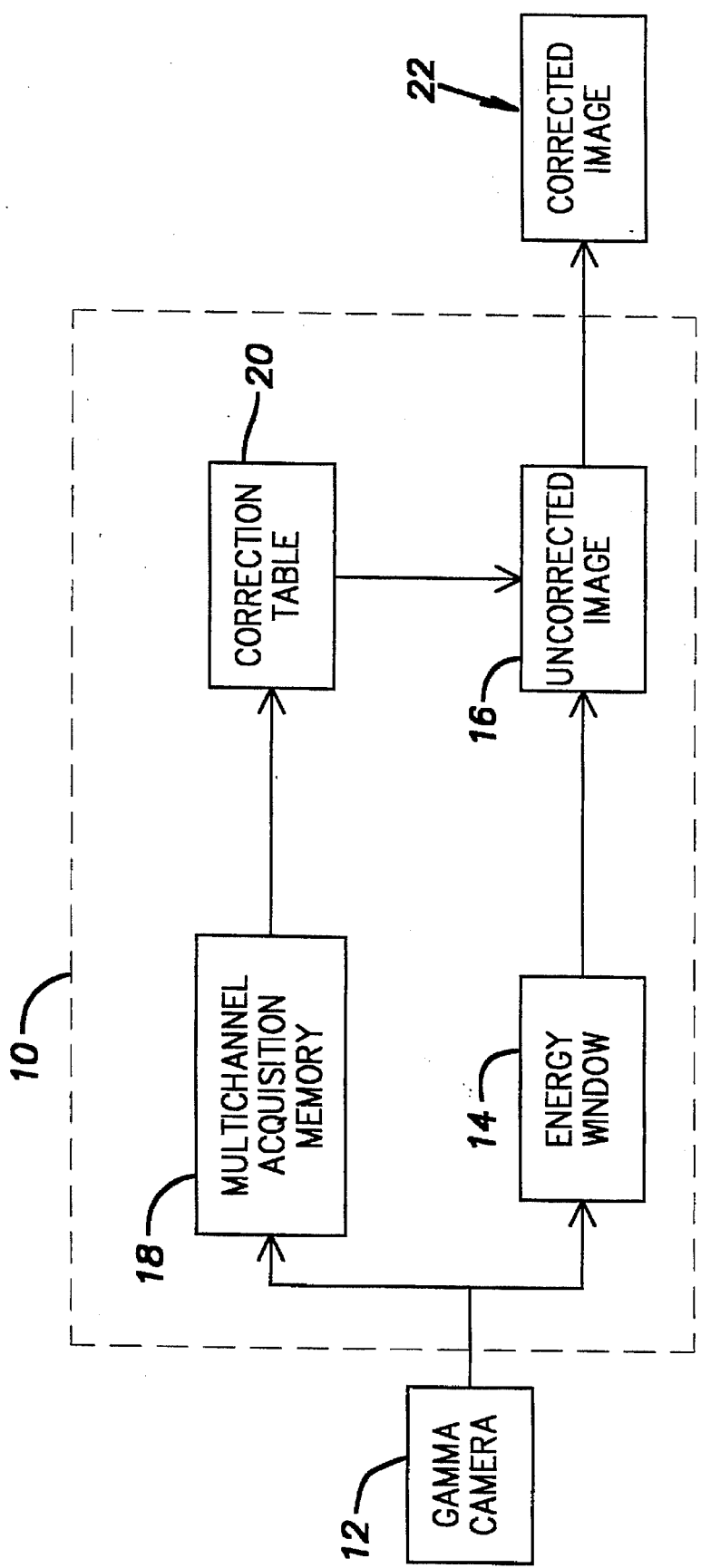
FIG. 3 is a block diagram of a data processing system suitable for performing a method according to the invention.

Referring to FIG. 3, a data processing system 10 receives event data from a gamma camera 12. For each event, this data includes the x-coordinate and y-coordinate of the event in the detection plane, along with the energy value. The system 10 may be implemented in specialized hardware or as part of a general purpose computer.

The data from the camera 12 branches in one path to a conventional image memory 16. If the energy of an event is within an energy window 14, the event is stored in the uncorrected image memory 16. The memory 16 stores the number of events or the count at each x,y location. The window 14 typically represents the photopeak area of the detected energy spectrum. For example, the photopeak window may correspond to plus or minus 10 percent about a spectral line of the radioisotope in use. For Tc-99m, a spectral line exists at 140 keV and the corresponding photopeak area is 126 keV to 154 keV.

The data from the camera 12 also follows a path where it is stored in a multichannel acquisition memory 18. The memory 18 stores not only the position (at the detector) of the event but also its energy, thus each position or pixel has a corresponding energy spectrum consisting of the number of events or counts at various energy levels. Data from the memory 18 is analyzed to create a correction table 20. The values from the correction table 20 are combined with the data in the memory 16 to create a corrected image 22. The corrected image 22 may be used directly, or more typically, undergoes further processing such as additional error correction and/or inclusion into 3-D images.

Figure 4:
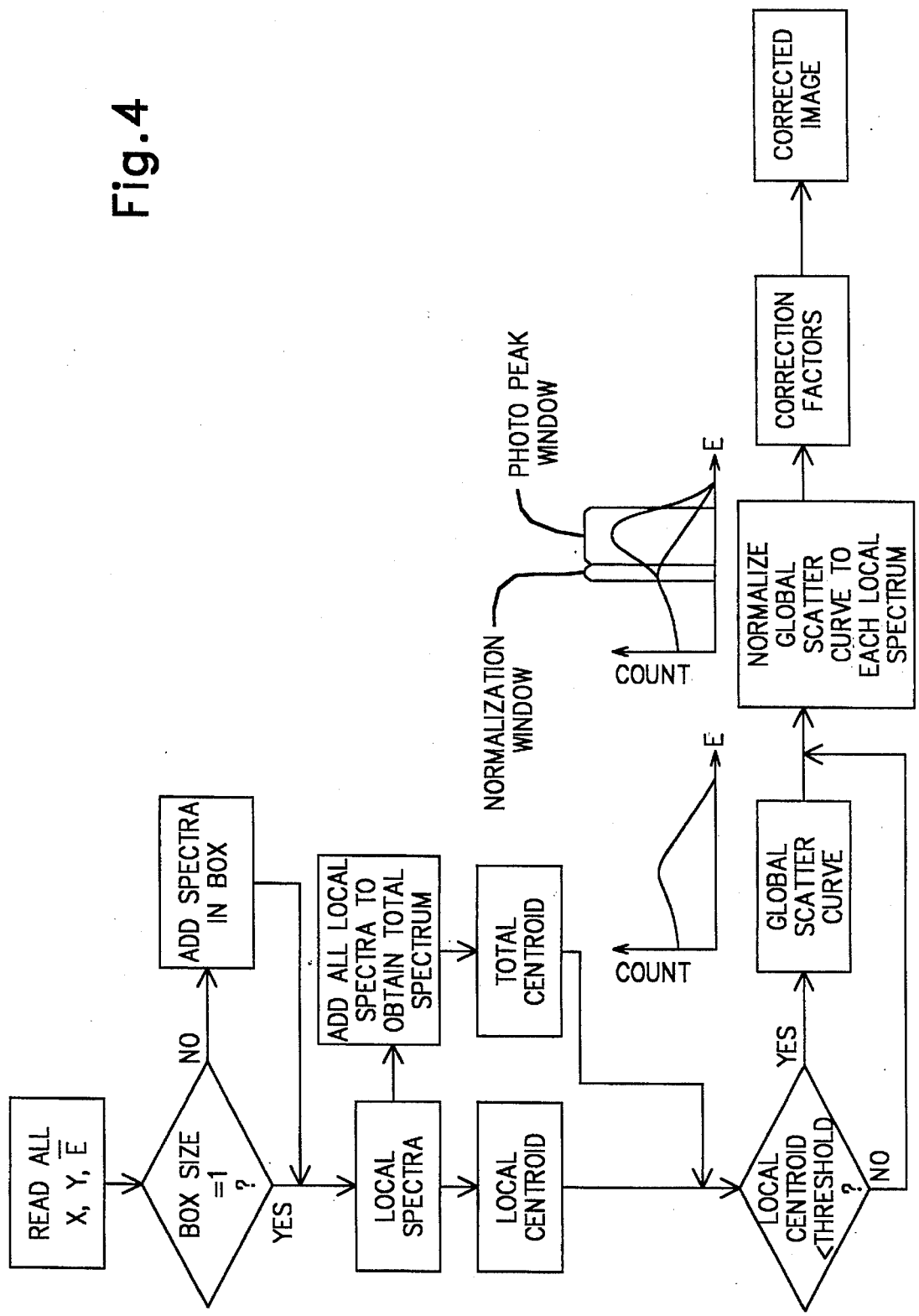
FIG. 4 is a flow chart diagram of a method according to the invention.

Referring to FIGS. 3 and 4, a flow chart shows the analysis performed on the data stored in the multichannel memory 18 to create the correction table 20 which is applied to the uncorrected image in memory 16 to produce the corrected image 22.

Sufficient counts need to have occurred at the positions of interest in an image to produce statistically reliable results. For example, 30 counts provides for reasonably reliable data.

In some cases, there may not be enough positions or pixels with sufficient counts to proceed on a pixel by pixel basis. In this case pixels can be grouped together to provide sufficient data.

For example, pixels may be grouped together in the form of 2 pixel by 2 pixel (4 pixel by 4 pixel, 8 pixel by 8 pixel, and so on) local areas or boxes.

Choosing local areas larger than a single pixel also may be desirable for reducing computational overhead, but at the expense of spatial resolution.

In the case of local areas larger than a single pixel, an energy spectrum for each local area is formed by adding the spectra of the individual pixels within the local area.

Whether a local area consists of 1×1 pixel or greater, an energy centroid is calculated for each local area based on the counts obtained at various energy levels. The energy centroids are calculated by the first momenta method.

All of the local area spectra are added and a total energy centroid is calculated for the summed spectra.

It has been found desirable also to exclude local areas having very few counts from the process (e.g., less than 30 counts).

It has been discovered that the best measures of scatter come from the local areas having a local energy centroid less than a threshold percentage of the total energy centroid. This percentage may be, for example, 95 to 99 percent, with 99 percent providing excellent results.

If a local energy centroid for a local area is less than the threshold, the corresponding spectrum for that local area is included in a sum of all such spectra to produce a global scatter curve.

The next task is to locally normalize the global scatter curve to provide a local scatter curve for each local area.

It has been discovered that a small window just below the low side of the photopeak is the optimal area for determining a normalization factor. This energy normalization window can be, for example, the energy range from 15 to 10 percent below a spectral line of the radioisotope in use. For the example of Tc-99m, this would be 119 keV to 126 keV.

A global scatter count is determined from the number of photon counts in the global scatter curve within the energy normalization window.

A local scatter count is determined for each local area from the number of photon counts in the respective local area within the energy normalization window.

The local scatter curves are determined by scaling the global scatter curve by the ratio of the respective local scatter count to the global scatter count.

The next task is to determine a local correction factor for each local area.

A local photopeak total count of photons is determined for each local area from the total number of photon counts in the respective local area within the photopeak window.

A local photopeak scatter count of photons is determined for each local area from the number of photon counts in the local scatter curve within the photopeak window.

Subtracting the ratio of the local photopeak scatter count to the local photopeak total count from one gives the local correction factor for each local area. This factor represents a estimate of the number of unscattered photons in the local area photopeak as a fraction of the total photons in the local area photopeak.

The resulting local correction factors can be stored in the table 20 and applied to the uncorrected image memory 16. Multiplication of respective correction factors times the counts stored in each position of the uncorrected image memory results in the corrected image 22.

Figure 5:
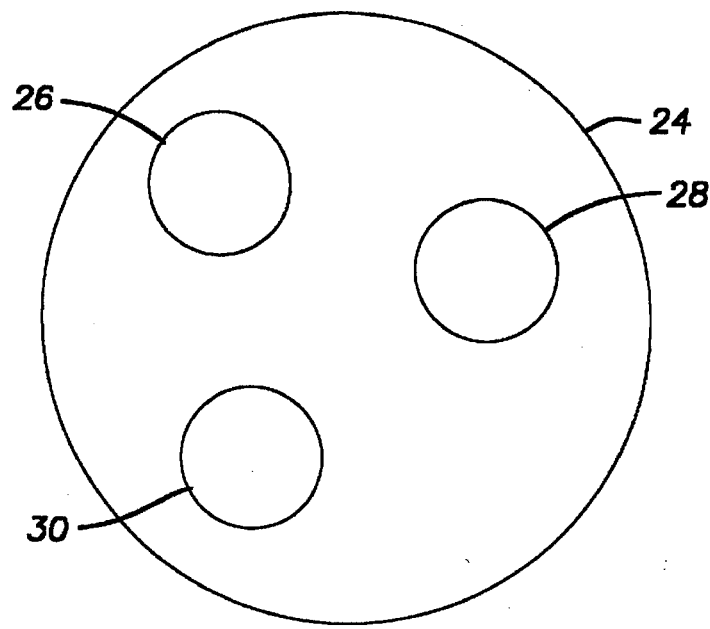
FIG. 5 is an axial end view of a cylindrical phantom.

Referring to FIG. 5, a cylindrical test phantom 24 contains three inner cylinders 26, 28, 30. The cylinder 26 is filled water containing a radioisotope. The cylinder 28 is filled with water containing a lesser concentration of a radioisotope. The balance of the phantom 24 is filled with water.

Figure 6:
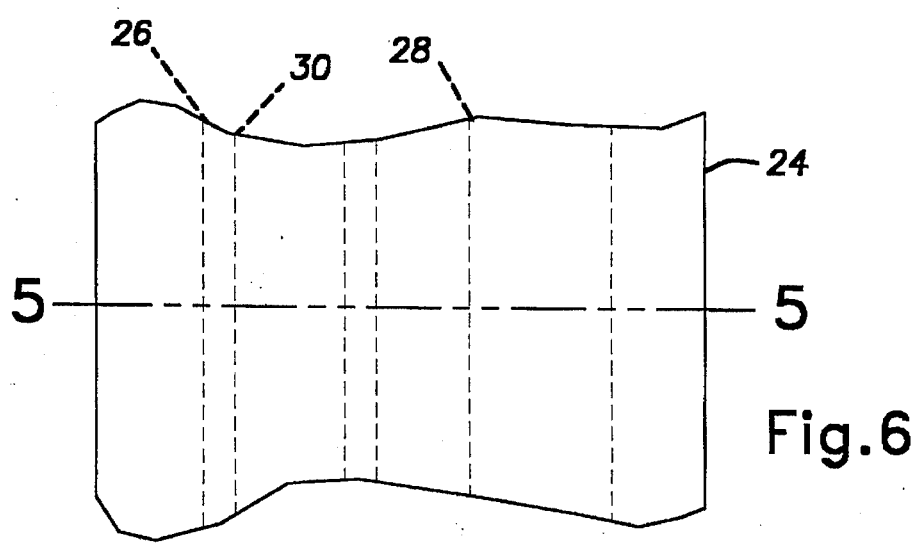
FIG. 6 is a partial plan view of the phantom of FIG. 5 as it is to be imaged.

Referring to FIG. 6, the phantom 24 is shown oriented to match the image plane.

Figure 7:
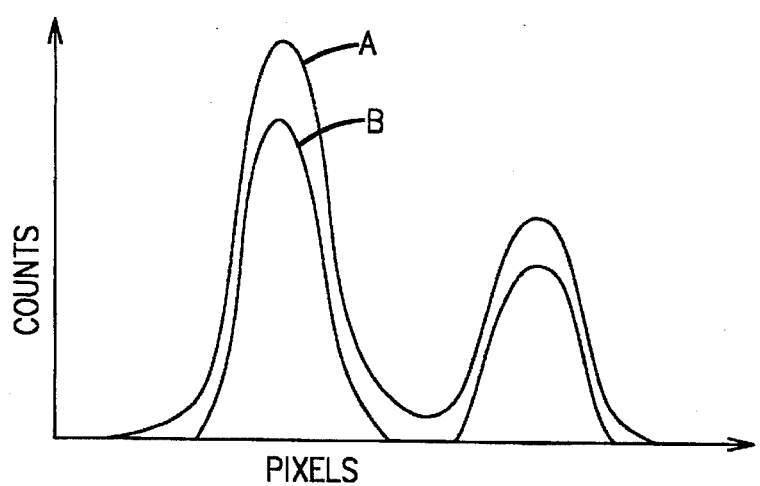
FIG. 7 is an exemplary graph of the camera image along the line 5—5 of FIG. 6 showing exemplary data with and without scatter correction according to the invention.

Referring to FIG. 7, a graph of exemplary one-dimensional image data is shown for the phantom 24 along the line 5—5. The graph A corresponds to the uncorrected image data and the graph B corresponds to image data Corrected by the invention. It can be seen that both resolution and contrast have been improved.

This elimination of scatter improves the resolution of an image and increases the contrast between "hot" and "cold" areas for emission studies. This method is applicable not only to emission images but also to the increasingly desirable transmission images. It allows measurement of attenuation coefficients for narrow beam geometry for transmission studies. It makes accurate quantitative analysis possible for both types of studies.

Because of the feature of acquiring local spectra, the camera energy response "map" across the camera face is measured without scattering, and this "energy map" with calculated energy centroid locations and peak FWHM for energy spectra at each pixel is stored. This map can be used during scatter correction as a table, but it also can be displayed as an image for quick inspection to make a decision if a new energy calibration is necessary.

As an additional feature, if the scatter curve is too noisy because of low statistics of events in local areas with "pure scattering", the scatter curve could be smoothed.

In order to verify the method for scatter removal, experimental studies were performed with a simple phantom. The phantom was a 20 cm diameter cylinder of 20 cm length. It contained three 5 cm cylinders inserted into the larger one (see FIGS. 5 and 6). The smaller cylinders could be filled with a water solution of Tc-99m of known activity. The outer cylinder could be empty, filled with inert water, or filled with water containing some background activity. Also, the inverse situation was addressed where activity was inserted in the outer cylinder and the inner cylinders could be empty, filled with inert water, or filled with water containing some background activity. In addition, scatter media consisting of 6 cm Lucite plates was inserted between the phantom and the collimator of the camera for some measurements in all cases the planar images of the phantom were acquired and analyzed in detail. The cylinder, with or without Lucite layers, was placed on the collimator in a vertical or horizontal orientation (the axis of the cylinder oriented perpendicular or parallel to the collimator surface, respectively). In experiments using Lucite layers, the cylinder was placed on a special support, that allowed the easy insertion of layers between the cylinder and collimator surface.

The images of the phantom were acquired simultaneously in two acquisition memories: one with the standard information of the spatial location of an event and, a second, special multichannel acquisition memory, which in addition to spatial (x,y) information of an event stored the energy spectrum of the events accumulated in a particular location.

Initially, activity was placed in a small cylinder and the outer cylinder filled with water. The image acquired in the multichannel acquisition memory was analyzed for the local area, or boxes, consisting of 2×2 pixels (box size of 7.2 mm). The spectra for different image areas were reconstructed. To describe the spectra, two parameters were used: spectra centroid location calculated by first momenta method and spectrum width—or peak FWHM. The areas were chosen starting from the middle of the bright area corresponding to an image of the central part of the small cylinder filled with activity (so-called "hot" area), following in the direction towards the edge of the hot area and continuing into a dark (or so called "cold") areas. It was found that across the hot area, the spectra shape remains basically constant with distinguishable change at the edge and gradual changing as the area under investigation is moved away from the hot area. The parameter more sensitive to spectrum change was found to be the centroid location, which was used therefore for further analysis.

For Tc-99m, the centroid location of box spectra changed less than 0.5 percent across the hot area, dropped about 1 percent at the edge, and shifted into the direction of smaller energies a few percent as boxes moved away from the hot area into the cold region where only the scattered photons contribution can be considered. The gradual shift of the centroid location of spectra is the result of larger contribution of photons of higher orders of scattering and photons the undergo only one scatter interaction, but with larger angle and larger energy transfer (so their resulting energy became lower).

Boxes were identified whose centroid location was shifted more than 1 percent in comparison with the centroid location for the image as a whole to obtain a scatter curve (or scatter function). The number and locations of chosen pixels were different with only one limitation of sufficient counting statistics to reconstruct the spectrum inside the box. For those boxes, the spectra were added to each other to result in a scatter curve. It was found that the shape of the resulting scatter curve is basically constant, and practically does not change for a particular study. The curve shape does change for different studies, for example, when using additional scatter material (Lucite layers), or using an active outside cylinder with nonactive or less active inside cylinders, of for different cylinder orientation. But for the same study, this shape is very stable if the two criteria of "centroid less than some threshold" and "enough counting statistics" are fulfilled.

When it was realized that the scatter curve should be normalized in each box with respect to the local spectrum, the question of how to normalize to local spectra of different shape arose. Research showed that the only energy region where behaviors of the local spectra and the scatter curve are similar is the region just below the photopeak region (defining the photopeak region as plus or minus 10 percent of the spectrum centroid location in case of scatter absence, i.e., as plus or minus 10 percent of the isotope line). For different phantom studies, the ratio of counts in channels below the photopeak region under curves of local spectra and scatter function was measured, and it was found that for a few energy channels below the photopeak region this ratio is almost constant. The ratio differs from study to study and from box to box, but for the same box, the ratio in this energy region is almost constant. For this reason (and because the contribution of scattered photons is most significant in this energy range and contribution of direct photons is less significant) this region was chosen for normalizations.

It is based on these observations that the above disclosed scatter elimination methods were developed.

The method has been tested on other phantoms than the cylinder phantom. These include a Jaszczak phantom, a human thorax phantom including a cardiac insert and a 3-D Hoffman brain phantom (planar and reconstructed SPECT projected SPECT images). The resulting images were examined for image quality, quantitative accuracy of spatial distribution, quantitative accuracy of energy spectra, and quantitative accuracy of source activity.

Image quality became much better, the edges were sharper, the contrast between hot and cold areas increased, and practically all counts outside the hot areas were removed.

Tails of spatial distributions correspondent to scattered photons were removed. The shape of spatial distributions is in correspondence with expected collimator response. The ratio of counts between hot and cold areas increased many times in correspondence with expectations for a particular phantom and particular study.

After scattered photon removal, the local energy spectrum shape became symmetric with parameters close to Gaussian (the ideal theoretical response) and close to the expected camera energy response function in the no scatter photon case.

With respect to source activity, after elimination of scatter photons, the number of counts in planar images for different phantoms became correspondent to that expected from known activity injected in a phantom.

From experiments, it was concluded that the invention improves image quality in terms of contrast between hot and cold areas and edge sharpness and provides scatter-free images for quantitative analysis.

Figure 8:
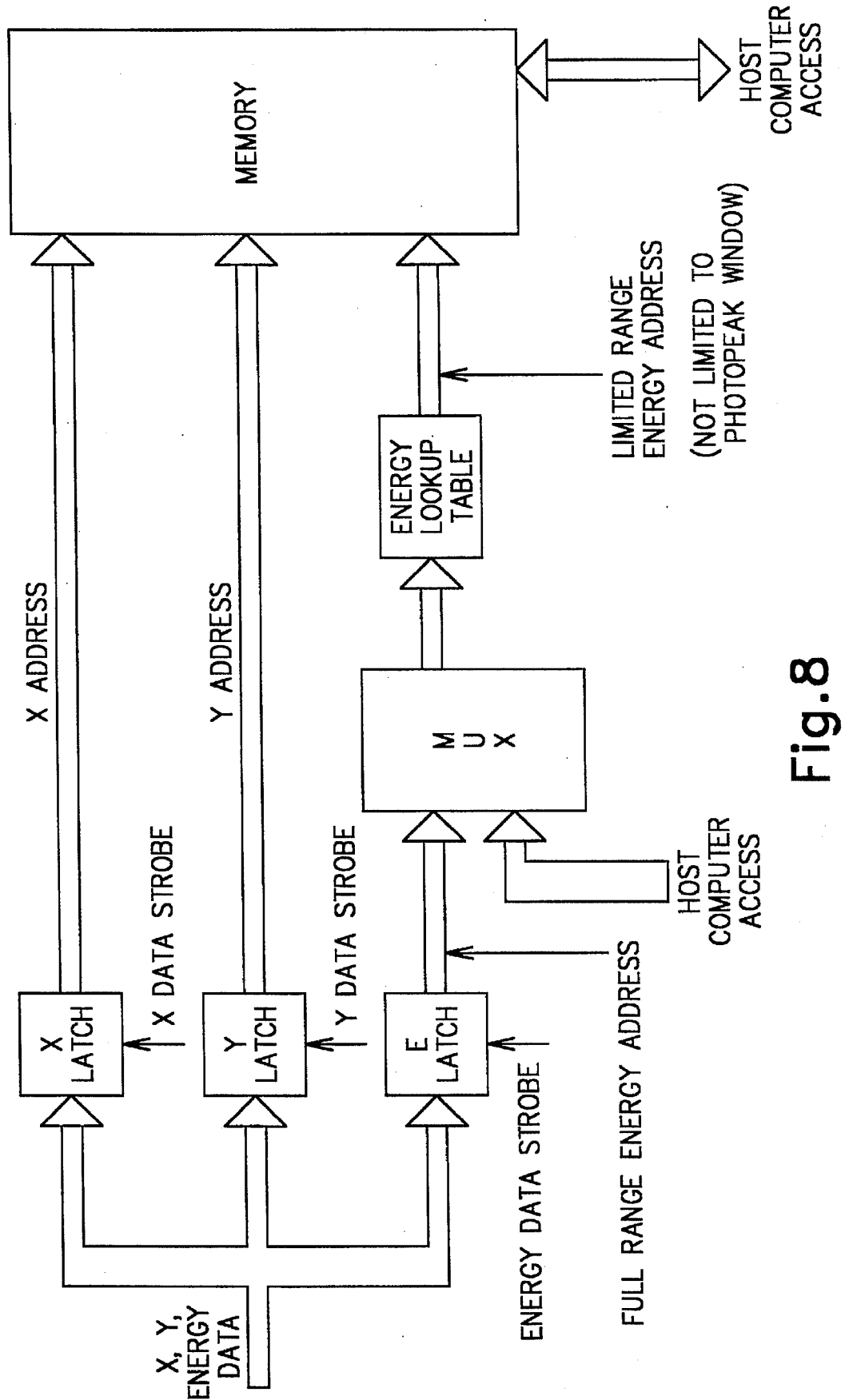
FIG. 8 is a block diagram of a multichannel acquisition memory suitable for use with the invention.

Referring to FIG. 8, the multichannel acquisition memory board used includes adjustable energy channels. These channels can be selected anywhere within the whole energy range. The channel boundaries are defined by a look-up table. This provides means to tailor each output channel to consist of any channels of MCA data. The best possible resolution was when one output channel corresponds to one MCA channel, approximately 1 KeV. The output channels include events outside the photopeak window that do not contribute to the acquired image. These channels can be divided in a way that part of them would cover one range of MCA channels, and the other part, the other range and so on. For example, using a multi-energy isotope like Ga-67, these channels could be divided to cover the energy range of each photopeak.

It should be evident that this disclosure is by way of example and that various changes may be made by adding, modifying or eliminating details without departing from the fair scope of the teaching contained in this disclosure. The invention is therefore not limited to particular details of this disclosure except to the extent that the following claims are necessarily so limited.

What is claimed:

1. A method for reducing scatter error in transmission or emission images, said method comprising:

collecting a planar photon image formed of counts collected in a matrix of pixels, each pixel including position coordinates and an energy spectrum for photons collected at said position coordinates;

dividing said image into a plurality of local areas, each local area including at least one pixel;

calculating a local energy centroid for each local area;

calculating a total energy centroid for the image;

using the spectra of local areas having respective energy centroids less than a known threshold percentage of the total energy centroid to estimate a local scatter correction factor for each local area; and applying respective local scatter correction factors to said image.

2. A method according to claim 1, wherein said image is a transmission image.

3. A method according to claim 1, wherein said image is an emission image.

4. A method according to claim 1, wherein said spectra of local areas having respective energy centroids less than a known percentage of the total energy centroid are summed to provide a global scatter curve.

5. A method according to claim 4, wherein said estimation further includes:

forming a local scatter curve for each local area by scaling the global scatter curve according to the ratio of counts within a known energy normalization window for said local area and for said global scatter curve; and using respective local scatter curves to estimate said local scatter correction factor for each local area.

6. A method according to claim 5, wherein said energy normalization window is a range from 10 to 15 percent below a spectral line of a radioisotope used to create said image.

7. A method according to claim 1, wherein local areas having a statistically unreliable number of counts are not used in determining said local correction factors.

8. A method according to claim 1, wherein said threshold percentage may be chosen from 95 to 99 percent.

9. A method according to claim 1, wherein if said local area contains more than one pixel, said energy spectrum for each pixel in said local area is added to form an energy spectrum for said local area.

10. A method for reducing scatter error in transmission or emission images, said method comprising:

collecting a planar photon image formed of counts collected in a matrix of pixels, each pixel including position coordinates and an energy spectrum for photons collected at said position coordinates;

dividing said image into a plurality of local areas, each local area including at least one pixel;

determining a global scatter curve;

forming a local scatter curve for each local area by scaling the global scatter curve according to the ratio of counts within a known energy normalization window for said local area and for said global scatter curve;

using respective local scatter curves to estimate a local scatter correction factor for each local area; and applying respective local scatter correction factors to said image.

11. A method according to claim 10, wherein said image is a transmission image.

12. A method according to claim 10, wherein said image is an emission image.

13. A method according to claim 10, wherein local areas having a statistically unreliable number of counts are not used in determining said local correction factors.

14. A method according to claim 10, wherein said energy normalization window is a range from 10 to 15 percent below a spectral line of a radioisotope used to create said image.

15. A method according to claim 10, wherein if said local area contains more than one pixel, said energy spectrum for each pixel in said local area is added to form an energy spectrum for said local area.

16. A method according to claim 10, wherein said determining a global scatter curve includes:

calculating a local energy centroid for each local area;

calculating a total energy centroid for the image; and using the spectra of local areas having respective energy centroids less than a known threshold percentage of the total energy centroid to determine the global scatter curve.

17. A method according to claim 16, wherein said spectra of local areas having respective energy centroids less than a known threshold percentage of the total energy centroid are summed to provide the global scatter curve.

18. A method according to claim 16, wherein said threshold percentage may be chosen from 95 to 99 percent.

19. A method for reducing scatter error in transmission or emission images, said method comprising:

collecting a planar photon image formed of counts collected in a matrix of pixels, each pixel including position coordinates and an energy spectrum for photons collected at said position coordinates;

dividing said image into a plurality of local areas, each local area including at least one pixel;

calculating a local energy centroid for each local area;

calculating a total energy centroid for said image;

using the spectra of local areas having respective energy centroids less than a known threshold percentage of the total energy centroid to determine a global scatter curve determining a global scatter count of photons in said global scatter curve within a known energy normalization window;

determining a local scatter count of photons in each said local area within said normalization window;

determining a local scatter curve for each local area by scaling said global scatter curve by a normalizing ratio of each respective local scatter count to said global scatter count;

determining a local photopeak total count of photons in each said local area within a photopeak energy window;

determining a local photopeak scatter count of photons in each said local scatter curve within said photopeak energy window;

determining a local correction factor for each local area from a correction ratio of each respective local photopeak scatter count to said local photopeak total count; and applying each local correction factor to a respective local area to provide a scatter corrected image.

20. A method according to claim 19, wherein said image is a transmission image.

21. A method according to claim 19, wherein said image is an emission image.

22. A method according to claim 19, wherein local areas having a statistically unreliable number of counts are not used in determining said local correction factors.

23. A method according to claim 19, wherein said threshold percentage may be chosen from 95 to 99 percent.

24. A method according to claim 19, wherein said energy normalization window is a range from 10 to 15 percent below a spectral line of a radioisotope used to create said image.

25. A method according to claim 19, wherein said photopeak energy window is a range from 10 percent below to 10 percent above a spectral line of a radioisotope used to create said image.

26. A method according to claim 19, wherein if said local area contains more than one pixel, said energy spectrum for each more than one pixel is added to form an energy spectrum for said local area.

* * * * *